United States Patent [19]

Meyer et al.

[11] Patent Number: 4,490,665
[45] Date of Patent: Dec. 25, 1984

[54] METHOD FOR DRIVING A STEPPER MOTOR

[75] Inventors: Richard C. Meyer, LaHabra; Peter Kan, Fullerton, both of Calif.

[73] Assignee: Beckman Instruments, Inc., Fullerton, Calif.

[21] Appl. No.: 517,487

[22] Filed: Jul. 26, 1983

[51] Int. Cl.³ .......................................... H02K 29/04
[52] U.S. Cl. .................................... 318/696; 318/685
[58] Field of Search ...................... 318/696, 685, 341

[56] References Cited

U.S. PATENT DOCUMENTS 4,145,643  3/1979  Maeda et al. .
4,156,170  5/1979  Strunc .
4,172,990  10/1979  Everett et al. ...................... 318/685
4,250,544  2/1981  Alley .
4,377,847  3/1983  Daniel et al. .

Primary Examiner—J. V. Truhe
Assistant Examiner—Saul M. Bergmann
Attorney, Agent, or Firm—W. H. May; T. R. Schulte; G. T. Hampson

[57] ABSTRACT

A method for driving a stepper motor. The method includes varying the width of the high level drive impulses of a bi-level drive system based on the desired speed to be achieved by the stepper motor. A microprocessor is used to vary the pulse width.

4 Claims, 5 Drawing Figures

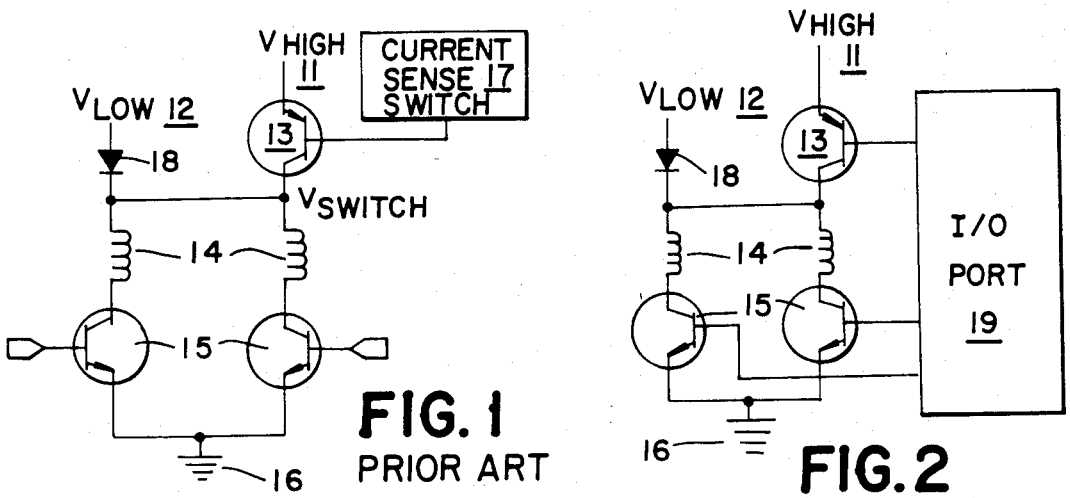
FIG. 1 PRIOR ART
FIG. 2
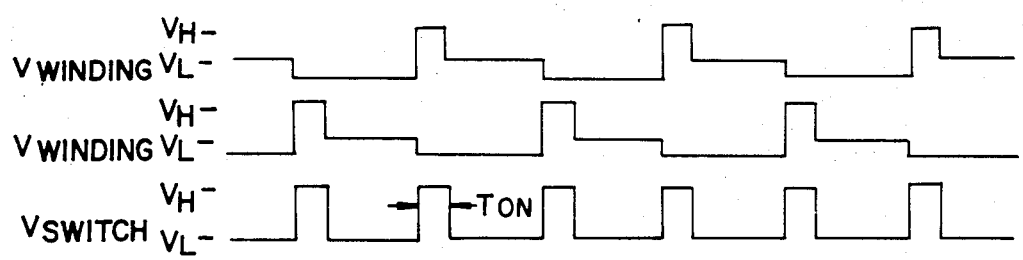
FIG. 3
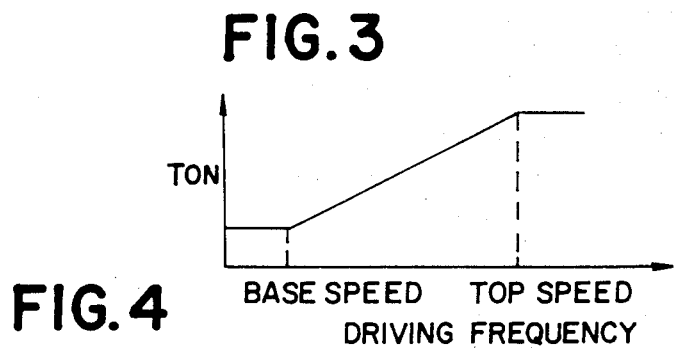
FIG. 4
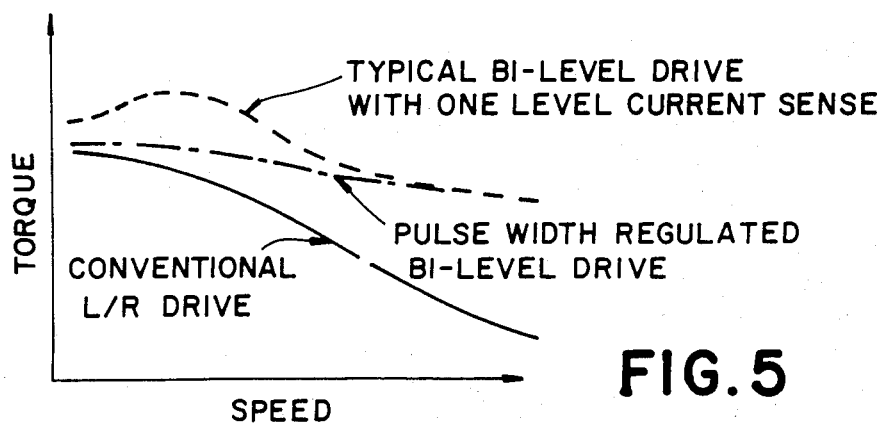
FIG. 5

METHOD FOR DRIVING A STEPPER MOTOR

BACKGROUND OF THE INVENTION

1. Field of the Invention

The invention relates to the field of electromotive power systems. More particularly, the invention relates to the field of stepping motors. In still greater particularity, the invention relates to the field of stepping motor speed controls. By way of further characterization, but not by way of limitation thereto, the invention is a method for driving a stepping motor by regulating the pulse width of the drive pulses with a microprocessor.

2. Description of the Prior Art

Previously, a limitation in the use of stepping motors was its inability to run at high speeds. This limitation was due to motor winding inductance. That is, it takes time for the windings to be energized to their rated current. This lack of instantaneous response causes the motor to stall at higher frequencies.

There are several solutions in existence to solve the above described problem. One solution is to provide a constant current source for the motor instead of a constant voltage source. A second solution is to start off each step with a higher voltage across the winding and then drop to a standby voltage as soon as the motors' rated current is reached. This second approach has been widely adopted and a number of devices today incorporate this type of bi-level driving circuit. However, employing this kind of a bi-level drive causes the motor to run with excess vibration and resonance producing audible noise at lower frequencies because it is being driven unnecessarily hard. That is, the high voltage supplied initially causes instantaneous high torque which results in abrupt rotor displacement with overshoot and oscillation. It would be desirable to have a method for employing the bi-level driving circuit and yet avoiding the rough motor problem at low speeds.

SUMMARY OF THE INVENTION

The invention is a method for driving a stepper motor employing a bi-level stepper motor driving circuit. A high voltage is supplied to the stepper motor for a predetermined time as determined by a microprocessor based on the required speed of the stepper motor. That is, for slower speeds, the high voltage pulse needs to be supplied for only a short time, or not at all while for higher speeds, the high voltage pulse would be supplied for a longer time. After the high voltage pulse has been supplied for the predetermined time the voltage is stepped down to the standby or low voltage as with a conventional bi-level driving circuit.

BRIEF DESCRIPTION OF THE DRAWINGS

FIG. 1 shows a prior art bi-level stepper motor drive circuit;

FIG. 2 shows a bi-level stepper motor drive circuit with a microprocessor control;

FIG. 3 is a diagram of the driving wave forms for a bi-level drive circuit;

FIG. 4 is a graph of drive pulse width versus driving frequency; and

FIG. 5 is a graph of torque versus speed.

DESCRIPTION OF THE PREFERRED EMBODIMENT

FIG. 1, a prior art bi-level stepper motor driver circuit, includes a high voltage source 11 and a low voltage or stand-by voltage source 12. A transistor 13 is used as a switch to supply the high voltage to the stepper motor windings 14. A pair of transistors 15 is used as switches to allow current to flow through windings 14 to a ground 16. A current sense switch 17 is connected to transistor 13 in order to control the supply of high voltage 11 to windings 14. A diode 18 controls low voltage supply 12 to winding 14.

Referring to FIG. 2, a stepper motor driving circuit is shown in which an I/O Port 19 of a microprocessor is connected to transistors 13 and 15 and replaces current sense switch 17.

MODE OF OPERATION

Referring to FIG. 1, in a standard bi-level driving circuit current sense switch 17 is used to control the high voltage source supplied to the motor windings 14. That is, when the circuit is turned on by transistors 15 allowing current to flow through windings 14, the low voltage would normally be on. However, because of decoupling diode 18, high voltage 11 is supplied to windings 14 when switch 13 is on. When switch 13 is off low voltage 12 is supplied to windings 14. Thus, the low voltage is designated the standby or running voltage while high voltage 11 is designated as the initial driving voltage.

The use of the above described circuit overcomes the problem of stepper motor response time. That is, because it takes time for the windings 14 to reach their rated current, high voltage 11 is supplied to windings 14 to speed up the process. However, windings 14 should not be supplied with the high voltage indefinitely in order to prevent overheating. Thus, when the current in the circuit reaches the rated current of windings 14 as sensed by current sense switch 17, high voltage 11 is turned off by switch 13. At this point, low voltage 12 takes over to drive the stepper motor. As discussed above, while this overcomes the problem of time delay in the windings 14 reaching their rated current, it creates a problem in that the stepper motor runs very rough and noisy at lower speeds because it is being driven by the high voltage for an unnecessarily long time period.

Referring to FIG. 2, an I/O Port under microprocessor control may be employed to regulate switches 13 and 15. That is, rather than sensing the current in the windings, a microprocessor may be used to vary the pulse width depending on the desired speed at which the stepping motor is to be driven. Since most systems today which include a stepper motor have a microprocessor included with the system, use of the microprocessor to generate the necessary driving wave forms for the stepping motor can be accomplished without the addition of extra hardware or logic.

FIG. 3 shows the driving wave forms for a bi-level drive circuit. The winding represents the voltage across the motor winding and the switch represents the voltage at the center tap of the windings. For a regular bi-level driver as in FIG. 1, the high voltage is turned off after predetermined current is built up in the winding. The amount of time the high voltage stays on, designated herein as $T_{on}$, is only dependent upon the magnitude of the high voltage and is totally independent of the driving frequency. Thus, for a given high voltage, $T_{on}$ is constant throughout the whole frequency range thus driving the windings with the maximum current for fixed time no matter what the stepper motor speed is to be.

In the present method $T_{on}$ is varied by increasing the amount of time the high voltage stays on as the stepper motor speed is increased and decreasing $T_{on}$ when the stepper motor speed is decreased. The current in the windings is thus regulated to provide a smooth running motor at all speeds. By conventional methods, an empirical determination of the relationship between $T_{on}$, motor speed, and audible noise can be devised for a particular system or application. That is, referring to FIG. 4, if high voltage switch 13 is under the control of the microprocessor, the relationship between $T_{on}$ and frequency can be varied to any desired parameter. FIG. 4 shows an example of a linear relationship between $T_{on}$ and frequency. When this is programmed into the microprocessor as a "look-up chart" the method disclosed herein can be employed. That is, varying $T_{on}$ will allow the high voltage to be supplied to the stepping motor windings for only the time necessary to get the current to the desired level. Supplying the high voltage to the windings longer than needed and thereby overdriving the motor at low speeds will be thus be prevented.

Referring to FIG. 5 a graph of torque versus speed is shown. The solid line curve shows the torque speed relationship for a conventional L/R drive. The dotted line curve is typical of a bi-level drive with bi-level current sensor. The broken line curve shows a torque speed relationship for a drive using the method of the present invention. Thus, the initial unneeded torque in previous bi-level drives which caused the rough and noisy motor problems at low speeds is eliminated. However, the high levels of torque needed at higher speeds are preserved. The method disclosed herein thus serves to smooth the curve employed with a bi-level drive.

While the invention has been disclosed with respect to a preferred embodiment thereof, it is not to be so limited as changes in modifications may be made which are within the full intended scope of the invention. The method disclosed herein is a novel and unobvious method for driving a stepper motor by controlling the pulse width of the driving pulses. The disclosure herein enables one skilled in the art to employ the method as claimed.

What is claimed is:

1. A method for driving a stepper motor wherein at least some steps of the motor rotation each comprise:
   supplying a first voltage to the motor for a time period, such time period being selected as a function of the required speed of the motor; and
   supplying a second lower voltage to the motor for the remainder of the motor step after the time period ends.

2. A method as in claim 1 wherein the time period increases with increasing required motor speed.

3. A method as in claim 2 wherein the time period increases as a linear function with increasing required motor speed.

4. A method for driving a stepper motor wherein at least some steps of the motor rotation each comprise:
   beginning the motor step by supplying a first voltage to the motor;
   terminating the first voltage at a time defining a time period which is a function of the required speed of the motor, such time period increasing with increasing required motor speed; and
   supplying a second lower voltage to the motor for the remainder of the motor step upon the termination of the first voltage.

* * * * *